(12) United States Patent
Larkin et al.

(10) Patent No.: US 7,532,768 B2
(45) Date of Patent: May 12, 2009

(54) METHOD OF ESTIMATING AN AFFINE RELATION BETWEEN IMAGES

(75) Inventors: Kieran Gerard Larkin, Putney (AU); Peter Alleine Fletcher, Rozelle (AU)

(73) Assignee: Canon Kabushiki Kaisha, Tokyo (JP)

( * ) Notice: Subject to any disclaimer, the term of this patent is extended or adjusted under 35 U.S.C. 154(b) by 260 days.

(21) Appl. No.: 10/569,972

(22) PCT Filed: Nov. 4, 2004

(86) PCT No.: PCT/AU2004/001532

§ 371 (c)(1),
(2), (4) Date: Oct. 13, 2006

(87) PCT Pub. No.: WO2005/045763

PCT Pub. Date: May 19, 2005

(65) Prior Publication Data

US 2007/0092159 A1   Apr. 26, 2007

(30) Foreign Application Priority Data

Nov. 4, 2003   (AU) ............... 2003906082

(51) Int. Cl.
  *G06K 9/36*   (2006.01)
  *G06K 9/00*   (2006.01)
  *G09G 5/00*   (2006.01)
(52) U.S. Cl. .................. 382/276; 382/100; 345/648; 345/619
(58) Field of Classification Search ............ 382/276
See application file for complete search history.

(56) References Cited

U.S. PATENT DOCUMENTS

| 4,941,193 | A | * | 7/1990 | Barnsley et al. | ............. 382/249 |
| 4,969,036 | A | * | 11/1990 | Bhanu et al. | ............. 348/113 |
| 5,613,013 | A | * | 3/1997 | Schuette | ............. 382/124 |
| 5,657,402 | A | * | 8/1997 | Bender et al. | ............. 382/284 |
| 5,774,133 | A | * | 6/1998 | Neave et al. | ............. 345/505 |

(Continued)

FOREIGN PATENT DOCUMENTS

JP   9-98424   4/1997

(Continued)

OTHER PUBLICATIONS

Amnon Shashua and Nassir Navab, Relative Affine Structure: Canonical Model for 3D from 2D Geometry and Applications, IEEE Transactions on Pattern Analysis and Machine Intelligence, col. 18, No. 9, Sep. 1996, pp. 873-883.*

(Continued)

*Primary Examiner*—Vikkram Bali
*Assistant Examiner*—Michelle Entezari
(74) *Attorney, Agent, or Firm*—Fitzpatrick, Cella, Harper & Scinto

(57) ABSTRACT

A method (400) is disclosed for estimating an affine relation between a first image and a second image. The first and second images each have at least 4 non-parallel lines therein. The method (400) starts by identifying (406) sets of intersection points of the lines appearing in each of the images. The method (400) then determines (412) whether a relation between intersection points exists. If the relation exists then the first and second images are affine related and the affine distortion may be inverted (418).

12 Claims, 10 Drawing Sheets

U.S. PATENT DOCUMENTS

| | | | | |
|---|---|---|---|---|
| 6,272,248 | B1 * | 8/2001 | Saitoh et al. | 382/218 |
| 6,671,386 | B1 * | 12/2003 | Shimizu et al. | 382/100 |
| 6,671,388 | B1 * | 12/2003 | Op De Beeck et al. | 382/100 |
| 6,684,193 | B1 * | 1/2004 | Chavez et al. | 705/8 |
| 7,031,493 | B2 | 4/2006 | Fletcher et al. | |
| 7,054,461 | B2 * | 5/2006 | Zeller et al. | 382/100 |
| 7,158,653 | B2 | 1/2007 | Fletcher et al. | |
| 2001/0055390 | A1 * | 12/2001 | Hayashi et al. | 380/220 |
| 2002/0051572 | A1 * | 5/2002 | Matsumoto et al. | 382/190 |
| 2002/0145759 | A1 * | 10/2002 | Miller | 358/3.28 |
| 2003/0072468 | A1 | 4/2003 | Brunk et al. | |
| 2003/0133589 | A1 | 7/2003 | Deguillaume et al. | |
| 2003/0231768 | A1 | 12/2003 | Fletcher | |
| 2004/0086197 | A1 * | 5/2004 | Fletcher et al. | 382/276 |
| 2005/0147296 | A1 * | 7/2005 | Hilton et al. | 382/170 |
| 2005/0242568 | A1 | 11/2005 | Long et al. | |

FOREIGN PATENT DOCUMENTS

| | | |
|---|---|---|
| WO | 2004/014079 | 2/2004 |

OTHER PUBLICATIONS

H.B. Chan and Y.S. Hung, Matching Patterns of Line Segments by Eigenvector Decomposition, Fifth IEEE Southwest Symposium on Image Analysis and Interpretation, 2002.*

* cited by examiner

METHOD OF ESTIMATING AN AFFINE RELATION BETWEEN IMAGES

FIELD OF THE INVENTION

The present invention relates generally to image processing and, in particular, to estimating an affine relation between images.

BACKGROUND

Watermarks are often used to embed information into an image imperceptibly. However, many of the watermarks in general use are destroyed by distortions, such as scaling, rotation, shearing, and anamorphic scaling. Some watermark detection methods are even sensitive to translations.

Various methods have been proposed for detecting watermarks, with some of those methods said to be invariant to affine distortions. However, most methods that are invariant to affine distortions require, at some stage, an extensive search through a space of parameters defining the affine distortions. Such searches may cover many dimensions and typically consume considerable computing capacity.

Recently some methods have been proposed that reduce the search space by performing transformations which first remove the translation, then convert scaling and rotation into further translation effects in two orthogonal directions. These methods are known as RST (Rotation, Scale, and Translation) invariant methods. Typically such techniques require complementarity of the embedding and detection procedures.

Other techniques rely on embedding patterns with special symmetry properties, such as rotational symmetry, and then detecting those patterns by extensive search over the non-symmetric distortion parameter(s).

As none of the aforementioned methods imbue full affine distortion invariance, an extensive search through one or more of the distortion parameter spaces is still required to ensure full invariance. Accordingly, there is a need for a method of estimating the parameters of the affine distortion without requiring an extensive search through a parameter space.

SUMMARY

It is an object of the present invention to substantially overcome, or at least ameliorate, one or more disadvantages of existing arrangements.

Disclosed are arrangements which seek to address the above problems. The arrangements estimate parameters of affine distortions applied to an image by identifying correspondences between intersection points of lines embedded into the image and that of a distorted version thereof.

According to an aspect of the present invention, there is provided a method for estimating an affine relation between first and second images, said images each having at least 4 non-parallel lines therein, said method comprising the steps of:

identifying a first set of intersection points of said lines appearing in said first image;

identifying a second set of intersection points of said lines appearing in said second image;

determining whether a relation between intersection points from said first and second sets of intersection points points exists, wherein if said relation exists then said first and second images are affine related.

According to yet another aspect of the present invention, there is provided a method of detecting an auxiliary pattern in a second image, said second image being an affine distorted version of a first image having said auxiliary pattern and at least 4 non-parallel lines therein, said lines forming a first set of intersection points at predetermined positions, said method comprising the steps of:

identifying a second set of intersection points of said lines appearing in said second image;

identifying relation between intersection points from said first and second sets of intersection points;

estimating said affine distortion parameters using said first and second sets of intersection points;

applying said affine distortions to said auxiliary pattern to form a distorted auxiliary pattern, said affine distortions being defined by said affine distortion parameters; and detecting said distorted auxiliary pattern in said second image.

According to yet another aspect of the present invention, there is provided an apparatus for implementing any one of the aforementioned methods.

According to another aspect of the present invention there is provided a computer program product including a computer readable medium having recorded thereon a computer program for implementing any one of the methods described above.

Other aspects of the invention are also disclosed.

BRIEF DESCRIPTION OF THE DRAWINGS

One or more embodiments of the present invention will now be described with reference to the drawings, in which.

DETAILED DESCRIPTION INCLUDING BEST MODE

Figure 1A:
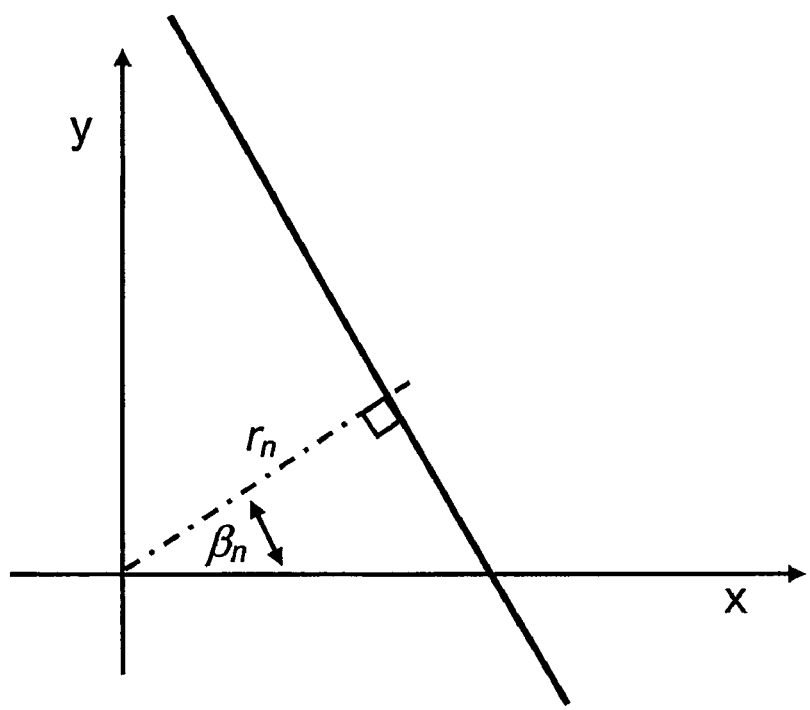
FIG. 1A shows a straight-line embedded into an image and the parameters defining the straight-line.

Where reference is made in any one or more of the accompanying drawings to steps and/or features, which have the same reference numerals, those steps and/or features have for the purposes of this description the same function(s) or operation(s), unless the contrary intention appears.

Consider a straight-line n in an image, an example of which is illustrated in FIG. 1A. It would be understood by a skilled person in the art that the straight-line n may be represented in a number of ways. For example, two points may be used to represent the straight-line n. The straight-line n may also be embedded into the image, or associated with one or more features in the image.

Figure 1B:
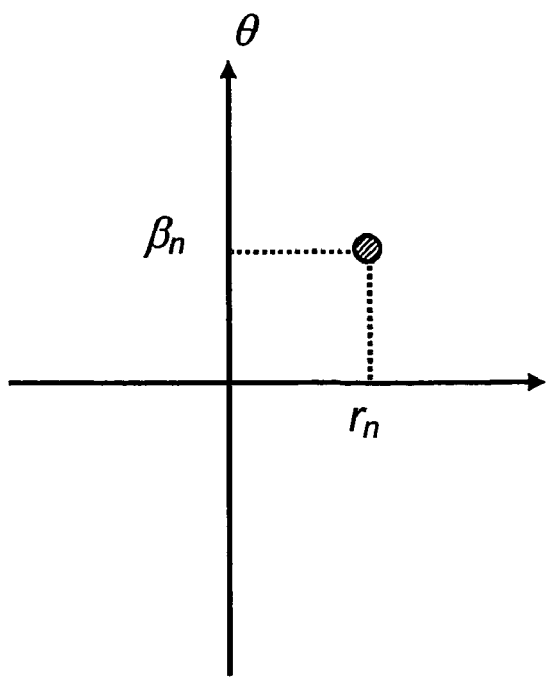
FIG. 1B illustrates the parameters defining the straight-line of FIG. 1A in the polar space.

The straight-line n is at an angle $\beta_n$ with the vertical Cartesian axis (Y-axis) and a distance $r_n$ from the Cartesian origin in a direction perpendicular to the straight-line n. The straight-line n is uniquely described by the parameter pair $\{r_n, \beta_n\}$. FIG. 1B illustrates the parameter pair $\{r_n, \beta_n\}$ defining the straight-line n in the polar space.

Referring again to FIG. 1A, a point (x,y) on the straight-line it and a distance $\lambda_n$ along the straight-line n may be written in canonical form as:

$$\begin{cases} x = r_n \cos\beta_n - \lambda_n \sin\beta_n \\ y = r_n \sin\beta_n + \lambda_n \cos\beta_n \end{cases} \quad (1)$$

Now consider a general affine distortion applied to the image including the straight-line n. The affine distortion may include one or more of rotation, scaling, shearing, reflection, translation, and anamorphic scaling. Let $(\tilde{x}, \tilde{y})$ be the transformed coordinates in the image of the original point (x,y) after the affine distortion, then point $(\tilde{x}, \tilde{y})$ may be written as:

$$\begin{pmatrix} \tilde{x} \\ \tilde{y} \end{pmatrix} = \begin{pmatrix} a_{11} & a_{12} \\ a_{21} & a_{22} \end{pmatrix} \begin{pmatrix} x \\ y \end{pmatrix} + \begin{pmatrix} x_0 \\ y_0 \end{pmatrix}. \quad (2)$$

wherein $a_{ij}$ are parameters defining rotation, scaling, shearing, reflection, and anamorphic scaling, and $(x_0, y_0)$ defines a translation.

It is assumed that $$\det\begin{pmatrix} a_{11} & a_{12} \\ a_{21} & a_{22} \end{pmatrix} \neq 0.$$

Furthermore, it is noted that $$\det\begin{pmatrix} a_{11} & a_{12} \\ a_{21} & a_{22} \end{pmatrix} < 0$$

indicates that a reflection has occurred.

The total distortion applied by the parameters $\alpha_{ij}$ may be decomposed into convenient combinations of the prime distortions, namely rotation, anamorphic scaling and shear as follows:

$$\begin{pmatrix} a_{11} & a_{12} \\ a_{21} & a_{22} \end{pmatrix} = \begin{pmatrix} A & 0 \\ 0 & B \end{pmatrix} \begin{pmatrix} 1 & R \\ 0 & 1 \end{pmatrix} \begin{pmatrix} \cos\omega & \sin\omega \\ -\sin\omega & \cos\omega \end{pmatrix} \cdot \text{Transpose} \quad (3)$$

wherein rotation by an angle $\omega$ is given by matrix:

$$\begin{pmatrix} \cos\omega & \sin\omega \\ -\sin\omega & \cos\omega \end{pmatrix} \quad (4)$$

anamorphic scaling along the X— and Y-axes is sometimes called aspect ratio change and has the form:

$$\begin{pmatrix} A & 0 \\ 0 & B \end{pmatrix} \quad (5)$$

shear in the x direction has the form:

$$\begin{pmatrix} 1 & R \\ 0 & 1 \end{pmatrix} \quad (6)$$

and the transposition, which is applied to place the rotation distortion in the correct quadrant so that $|\omega| \leq 45°$, is selected from one of the four options:

$$\text{Transpose} = \begin{pmatrix} 0 & 1 \\ -1 & 0 \end{pmatrix}, \begin{pmatrix} -1 & 0 \\ 0 & -1 \end{pmatrix}, \begin{pmatrix} 0 & -1 \\ 1 & 0 \end{pmatrix}, \begin{pmatrix} 1 & 0 \\ 0 & 1 \end{pmatrix}. \quad (7)$$

Affine distortions have the property that any straight line is preserved during affine distortion, along with the parallelism of lines, while lengths and angles change. Accordingly, the straight-line n in the image is transformed to a straight-line in the deformed image, but the straight-line in the deformed image is defined by parameter pair $\{\tilde{r}_n, \tilde{\beta}_n\}$, which is typically different from the parameter pair $\{r_n, \beta_n\}$ of the straight-line n before the affine distortions.

From Equations (1) and (2), and using the abbreviations $c_n = \cos\beta_n$, $s_n = \sin\beta_n$, the following relations exist:

$$\tan\tilde{\beta}_n = \frac{(a_{11}s_n - a_{12}c_n)}{(-a_{21}s_n + a_{22}c_n)} \quad (8)$$

and $$\tilde{r}_n = r_n \frac{(a_{11}c_n + a_{12}s_n)(-a_{21}s_n + a_{22}c_n) - (a_{21}c_n + a_{22}s_n)(-a_{11}s_n + a_{12}c_n)}{\sqrt{(a_{11}c_n + a_{12}s_n)^2 + (a_{11}c_n + a_{12}s_n)^2}} + \frac{x_0(-a_{21}s_n + a_{22}c_n) + y_0(a_{11}c_n + a_{12}s_n)}{\sqrt{(a_{11}c_n + a_{12}s_n)^2 + (a_{11}c_n + a_{12}s_n)^2}} \quad (9)$$

With Equations (8) and (9) including 6 unknown parameters $\{\alpha_{11}, \alpha_{12}, \alpha_{21}, \alpha_{22}, x_0, y_0\}$ defining the affine distortion, by having 3 straight-lines in the image, with each straight line n being defined by the parameter pair $\{r_n, \beta_n\}$ by detecting the 3 straight-lines in the affine distorted image, by determining the parameter pair $\{\tilde{r}_n, \tilde{\beta}_n\}$ for each affine distorted line, and by solving Equations (8) and (9), the parameters $\{\alpha_{11}, \alpha_{12}, \alpha_{21}, \alpha_{22}, x_0, y_0\}$ may be calculated. In order to distinguish reflection, a left-right asymmetry is also required when placing the straight-lines into the image.

However, from Equations (8) and (9) it can be seen that, when an affine distortion is applied to a straight-line, then the parameter pair $\{\tilde{r}_n, \tilde{\beta}_n\}$ is generally transformed in a rather complicated and ambiguous manner. The ambiguity occurs because a translation or scaling in the direction parallel to the straight-line n has no effect on the parameter pair $\{r_n, \beta_n\}$.

Figure 2A:
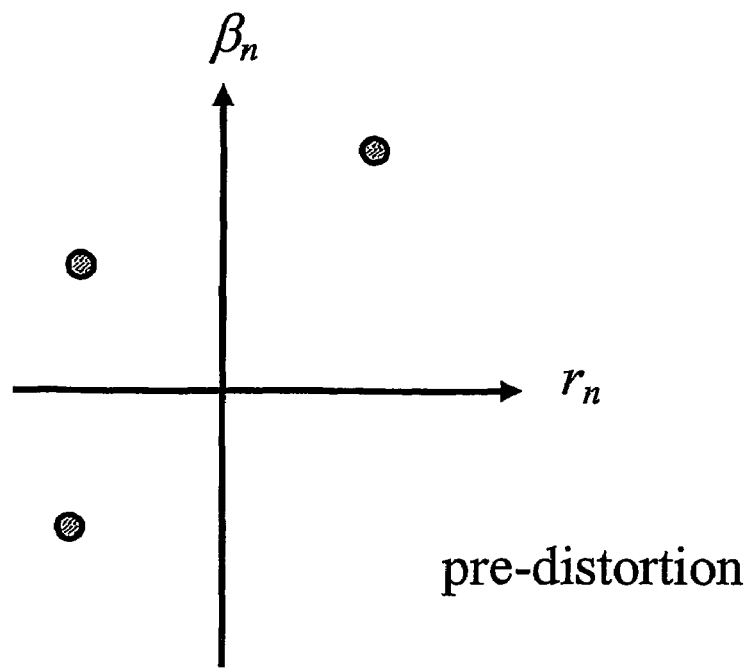
FIGS. 2A and 2B show the parameter pairs of the same 3 lines in the polar space before distortion and after distortion.
Figure 2B:
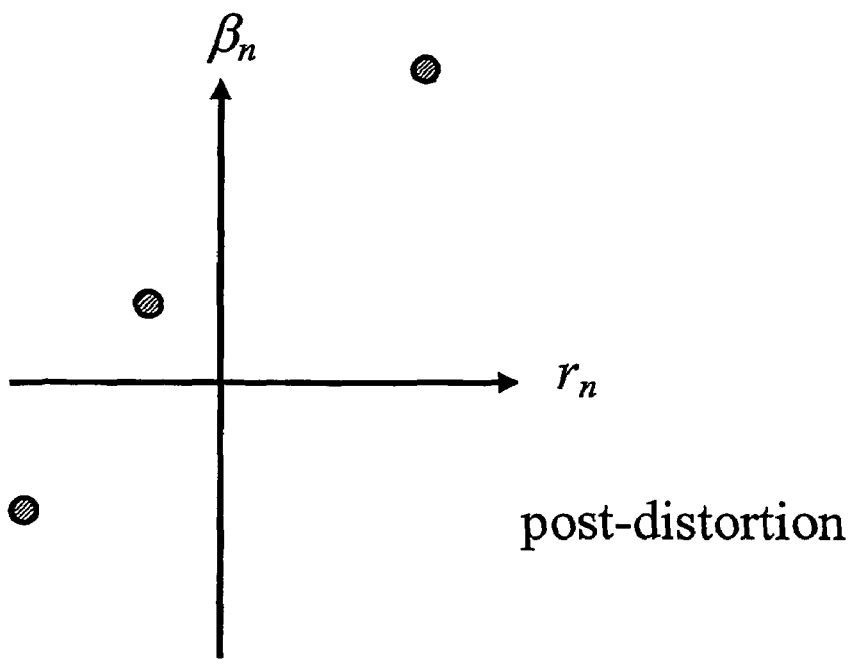

Also, identifying the distorted straight-line corresponding to the straight-line n in the image before affine distortion is non-obvious. To illustrate this, FIG. 2A shows the parameter pairs $\{r_n, \beta_n\}$ of 3 lines in the polar space before distortion, while FIG. 2B shows the parameter pairs $\{\tilde{r}_n,\tilde{\beta}_n\}$ of the same 3 lines after distortion. The correspondence between parameter pairs $\{r_n,\beta_n\}$ and $\{\tilde{r}_n,\tilde{\beta}_n\}$ before and after distortion is potentially ambiguous, leading to degeneracy and possible uncertainty.

A number of techniques may be used to uniquely identify the correspondence between each straight-line before and after affine distortion. One technique is to embed lines where the lines themselves are unique, and where the uniqueness of the lines are not destroyed by affine distortions. For example, lines having different styles, colors, etc. may be used to uniquely identify each straight-line.

Another useful property of affine distortions is that the ratio of two segments of a straight-line is invariant with respect to affine distortions. In the preferred implementation it is this property that is used to uniquely identify the correspondence between each straight-line before and after affine distortion.

Consider N straight-lines in an image, each of the straight-lines again being uniquely described by the parameter pair $\{r_n,\beta_n\}$, $n=1 \rightarrow N$, with angles $\beta_n \neq \beta_m$ when $n \neq m$. Hence the straight-lines are non-parallel.

Because the straight-lines are non-parallel, each straight-line intersects each other straight-line along its length. The maximum number of intersection points for N (non-parallel) straight-lines is the triangular number $N(N-1)/2$. The point $(x_{km},y_{km})$ where straight-line m intersects straight-line k is:

$$\begin{cases} x_{km} = x_m = x_k \\ y_{km} = y_m = y_k \end{cases} \Rightarrow \begin{cases} r_m\cos\beta_m - \lambda_{mk}\sin\beta_m = r_k\cos\beta_k - \lambda_{km}\sin\beta_k \\ r_m\sin\beta_m + \lambda_{mk}\cos\beta_m = r_k\sin\beta_k + \lambda_{km}\cos\beta_k \end{cases} \quad (10)$$

wherein $\lambda_{km}$ is the distance along straight-line k where straight-line m intersects. Similarly, distance $\lambda_{km}$ is the distance along straight-line m where straight-line k intersects.

Solving the simultaneous equations in Equation (10), the distance $\lambda_{km}$ is given by:

$$\lambda_{km} = \frac{r_k\cos(\beta_k - \beta_m) - r_m}{\sin(\beta_k - \beta_m)}. \quad (11)$$

Consider the case where the number of straight-lines N=4. Each line k would have 3 intersection points $(x_{km},y_{km})$ with the other 3 lines in. At this stage it is useful to order the distances $\lambda_{km}$ along straight-line k to the respective intersection points $(x_{km},y_{km})$ by size as follows:

$$\{\lambda_{km}\}_{max} > \{\lambda_{km}\}_{mid} > \{\lambda_{km}\}_{min}, \quad m=1 \rightarrow 4, m \neq k \quad (12)$$

With segment lengths $\xi_{k1}$ and $\xi_{k2}$ being defined as follows:

$$\xi_{k1} = \{\lambda_{km}\}_{max} - \{\lambda_{km}\}_{mid}; \text{ and} \quad (13)$$

$$\xi_{k2} = \{\lambda_{km}\}_{mid} - \{\lambda_{km}\}_{min} \quad (14)$$

a length ratio $R_k$ for line k is then defined as:

$$R_k = \min\left[\frac{\xi_{k1}}{\xi_{k2}}, \frac{\xi_{k2}}{\xi_{k1}}\right] \leq 1 \quad (15)$$

With the parameter pairs $\{r_n,\beta_n\}$ of the straight-lines suitably chosen, the ratio $R_k$ of each line k is distinct from that of every other line m. Because the ratio $R_k$ is invariant with respect to affine distortions, the correspondence between each straight-line before and after affine distortion can be uniquely determined.

Once the corresponding straight-lines have been identified, then the distances $\lambda_{km}$ along different straight-lines may be compared before and after affine distortion to estimate the scaling factors along each direction represented by the straight-line k. Also, the change in orientation of each straight-line may be used for estimation of a rotation component of the affine distortion.

Consider a particular case of a rotation followed by an anamorphic scaling applied to the original image, and as is defined in Equations (4) and (5) respectively. The anamorphic scaling has a scaling of factor A in a direction parallel to the horizontal Cartesian axis (X-axis), and a scaling of factor B in a direction perpendicular thereto, with the angle $\omega$ being the angle of rotation. In general, a line segment of length $l_n$ at an angle $\beta_n$ will be mapped to a line segment of length $\tilde{l}_n$ at an angle $\tilde{\beta}_n$, where:

$$[\tilde{l}_n]^2 = [l_n]^2\{[A\cos(\beta_n + \omega)]^2 + [B\sin(\beta_n + \omega)]^2\} \quad (16)$$

$$\tilde{\beta}_n = \arctan\frac{A\sin(\beta_n + \omega)}{B\cos(\beta_n + \omega)} - \omega \quad (17)$$

Equations (16) and (17) contain 3 unknowns, namely scaling factors A and B, and angle $\omega$. Having 4 lines embedded in the original image, and using the distance between the outer intersection points of each line as the length $l_n$ as follows:

$$l_k = \{\lambda_{kn}\}_{max} - \{\lambda_{kn}\}_{min}, \quad k=1 \rightarrow 4 \quad (18)$$

4 pairs of equations are obtained. Such an over-constrained system can be advantageously solved using a least squares method.

It is noted that Equations (16) and (17) are translation invariant, and do not make provision for translation $(x_0,y_0)$. Also, for all the parameters of the general affine distortion defined in Equation (2) to be calculated, the matrices of Equations (4) and (5) combined, as in Equation (3), but with the shear factor R being 0.

Alternatively, from the correspondence between each straight-line before and after affine distortion, the correspondence between the parameter pairs $\{r_n,\beta_n\}$ and $\{\tilde{r}_n,\tilde{\beta}_n\}$ is uniquely determined. Substituting Equation (11) into Equation (10), the intersection point $(x_{km},y_{km})$ is given by:

$$\begin{pmatrix} x_{km} \\ y_{km} \end{pmatrix} = \frac{1}{\sin(\beta_k - \beta_m)} \begin{pmatrix} \sin\beta_k & -\sin\beta_m \\ \cos\beta_k & \cos\beta_m \end{pmatrix} \begin{pmatrix} r_m \\ r_k \end{pmatrix}. \quad (19)$$

Because the straight-lines are non-parallel, $\sin(\beta_k - \beta_m) \neq 0$. In practical situations respective angles $\beta_k$ and $\beta_m$ are chosen such that $\sin^2(\tilde{\beta}_k - \tilde{\beta}_m) \geq 0.25$ holds. Equivalently, the angle at which lines k and m intersect satisfies $30° < |\tilde{\beta}_k - \tilde{\beta}_m| < 150°$.

Similarly, the transformed point $(\tilde{x}_{km},\tilde{y}_{km})$ corresponding to the intersection point $(x_{km},y_{km})$ is given by:

$$\begin{pmatrix} \tilde{x}_{km} \\ \tilde{y}_{km} \end{pmatrix} = \frac{1}{\sin(\tilde{\beta}_k - \tilde{\beta}_m)} \begin{pmatrix} \sin\tilde{\beta}_k & -\sin\tilde{\beta}_m \\ \cos\tilde{\beta}_k & \cos\tilde{\beta}_m \end{pmatrix} \begin{pmatrix} \tilde{r}_m \\ \tilde{r}_k \end{pmatrix}. \quad (20)$$

By substituting the parameter pairs $\{r_n,\beta_n\}$ and $\{\tilde{r}_n,\tilde{\beta}_n\}$ into Equations (19) and (20) respectively, and then solving Equation (2) using the corresponding intersection points $(x_{km},y_{km})$ and $(\tilde{x}_{km},\tilde{y}_{km})$, the affine distortion parameters $\{\alpha_{11}, \alpha_{12}, \alpha_{21}, \alpha_{22}, x_0, y_0\}$ may be obtained.

The preferred method of affine parameter estimation uses least squares fitting (LSF) between the intersection points $(x_{km}, y_{km})$ of the lines and the intersection points $(\tilde{x}_{km}, \tilde{y}_{km})$ after affine distortion. This LSF is greatly eased because the correspondence between the intersection points $(x_{km}, y_{km})$ and $(\tilde{x}_{km}, \tilde{y}_{km})$ is known. Without the unique identification of the correspondence between intersection points $(x_{km}, y_{km})$ and $(\tilde{x}_{km}, \tilde{y}_{km})$ it is necessary to evaluate the LSF for all possible permutations, in this case $6! = 720$.

Let the detected and (uniquely) ordered intersection points be denoted by $(\hat{x}_{km}, \hat{y}_{km})$. As before the original (undistorted) intersection points are $(x_{km}, y_{km})$, while the distorted intersection points are $(\tilde{x}_{km}, \tilde{y}_{km})$. An error energy is defined as the Euclidean norm measure E:

$$E = \sum_{m=1}^{k-1} \sum_{k=1}^{N} \{(\hat{x}_{km} - \tilde{x}_{km})^2 + (\hat{y}_{km} - \tilde{y}_{km})^2\} \quad (21)$$

Error energy minimization with respect to a transformation parameter p gives six equations:

$$\frac{\partial E}{\partial p} = 2 \sum_{m=1}^{k-1} \sum_{k=1}^{N} \left\{ (\hat{x}_{km} - \tilde{x}_{km}) \frac{\partial \tilde{x}_{km}}{\partial p} + (\hat{y}_{km} - \tilde{y}_{km}) \frac{\partial \tilde{y}_{km}}{\partial p} \right\} = 0, \text{ at minima} \quad (22)$$

with the transformation parameter p being one of the parameters $\alpha_{11}, \alpha_{12}, \alpha_{21}, \alpha_{22}, x_0$ and $y_0$ (Equation (2)) defining the transformation.

Fortunately the 6 equations represented in Equation (22) simplifies greatly because of the partial derivatives with respect to $p = \alpha_{ij}$:

$$\left. \begin{array}{l} \frac{\partial \tilde{x}_{km}}{\partial a_{11}} = x_{km}, \frac{\partial \tilde{x}_{km}}{\partial a_{12}} = 0, \frac{\partial \tilde{x}_{km}}{\partial a_{21}} = y_{km}, \frac{\partial \tilde{x}_{km}}{\partial a_{22}} = 0, \frac{\partial \tilde{x}_{km}}{\partial x_0} = 1, \frac{\partial \tilde{x}_{km}}{\partial y_0} = 0 \\ \frac{\partial \tilde{y}_{km}}{\partial a_{11}} = 0, \frac{\partial \tilde{y}_{km}}{\partial a_{12}} = y_{km}, \frac{\partial \tilde{y}_{km}}{\partial a_{21}} = 0, \frac{\partial \tilde{y}_{km}}{\partial a_{22}} = x_{km}, \frac{\partial \tilde{y}_{km}}{\partial x_0} = 0, \frac{\partial \tilde{y}_{km}}{\partial y_0} = 1 \end{array} \right\} \quad (23)$$

The six equations represented in Equation (22) are then essentially equivalent to matching the following summations:

$$\left\{ \begin{array}{l} \sum_{m=1}^{k-1} \sum_{k=1}^{N} \hat{x}_{km} x_{km} = \sum_{m=1}^{k-1} \sum_{k=1}^{N} \tilde{x}_{km} x_{km} \\ \sum_{m=1}^{k-1} \sum_{k=1}^{N} \hat{x}_{km} y_{km} = \sum_{m=1}^{k-1} \sum_{k=1}^{N} \tilde{x}_{km} y_{km} \\ \sum_{m=1}^{k-1} \sum_{k=1}^{N} \hat{y}_{km} x_{km} = \sum_{m=1}^{k-1} \sum_{k=1}^{N} \tilde{y}_{km} x_{km} \\ \sum_{m=1}^{k-1} \sum_{k=1}^{N} \hat{y}_{km} y_{km} = \sum_{m=1}^{k-1} \sum_{k=1}^{N} \tilde{y}_{km} y_{km} \\ \sum_{m=1}^{k-1} \sum_{k=1}^{N} \hat{x}_{km} = \sum_{m=1}^{k-1} \sum_{k=1}^{N} \tilde{x}_{km} \\ \sum_{m=1}^{k-1} \sum_{k=1}^{N} \hat{y}_{km} = \sum_{m=1}^{k-1} \sum_{k=1}^{N} \tilde{y}_{km} \end{array} \right. \quad (24)$$

Filling in the full transform parameters from Equations (22) and (23) gives a pair of 3×3 matrix equations with the same symmetric matrix multiplier M:

$$\begin{pmatrix} \sum_{m=1}^{k-1} \sum_{k=1}^{N} \hat{x}_{km} x_{km} \\ \sum_{m=1}^{k-1} \sum_{k=1}^{N} \hat{x}_{km} y_{km} \\ \sum_{m=1}^{k-1} \sum_{k=1}^{N} \hat{x}_{km} \end{pmatrix} = \quad (25)$$

$$\begin{pmatrix} \sum \sum x_{km} x_{km} & \sum \sum x_{km} y_n & \sum \sum x_{km} \\ \sum \sum y_{km} x_{km} & \sum \sum y_{km} y_{km} & \sum \sum y_{km} \\ \sum \sum x_{km} & \sum \sum y_{km} & \sum \sum 1 \end{pmatrix} \begin{pmatrix} a_{11} \\ a_{12} \\ y_0 \end{pmatrix} = M \begin{pmatrix} a_{11} \\ a_{12} \\ y_0 \end{pmatrix}$$

$$\begin{pmatrix} \sum_{m=1}^{k-1} \sum_{k=1}^{N} \hat{y}_{km} x_{km} \\ \sum_{m=1}^{k-1} \sum_{k=1}^{N} \hat{y}_{km} y_{km} \\ \sum_{m=1}^{k-1} \sum_{k=1}^{N} \hat{y}_{km} \end{pmatrix} = M \begin{pmatrix} a_{21} \\ a_{22} \\ y_0 \end{pmatrix} \quad (26)$$

-continued $$M = \quad (27)$$

$$\begin{pmatrix} S_{xx} & S_{xy} & S_x \\ S_{xy} & S_{yy} & S_y \\ S_x & S_y & S \end{pmatrix} = \begin{pmatrix} \sum \sum x_{km} x_{km} & \sum \sum x_{km} y_{km} & \sum \sum x_{km} \\ \sum \sum y_{km} x_{km} & \sum \sum y_{km} y_{km} & \sum \sum y_{km} \\ \sum \sum x_{km} & \sum \sum y_{km} & \sum \sum 1 \end{pmatrix}$$

The inverse of matrix M is another symmetric matrix $M^{-1}$, where $$M^{-1} = \frac{1}{|M|} \begin{pmatrix} -S_y S_y + S S_{yy} & -S S_{xy} + S_x S_y & S_{xy} S_y - S_x S_{yy} \\ -S S_{xy} + S_x S_y & -S_x S_x + S S_{xx} & S_x S_{xy} - S_{xx} S_y \\ S_{xy} S_y - S_x S_{yy} & S_x S_{xy} - S_{xx} S_y & -S_{xy} S_{xy} + S_{xx} S_{yy} \end{pmatrix} \quad (28)$$

and $$|M| = \det M = -S S_{xy} S_{xy} + 2 S_x S_{xy} S_y - S_{xx} S_y S_y - S_x S_x S_{yy} + S S_{xx} S_{yy} \quad (29)$$

Inverting Equations (25) and (26), the final solution for the least squares estimate of all six distortion parameters is explicitly:

$$\begin{pmatrix} a_{11} \\ a_{12} \\ x_0 \end{pmatrix} = M^{-1} \begin{pmatrix} \sum_{m=1}^{k-1}\sum_{k=1}^{N} \hat{x}_{km} x_{km} \\ \sum_{m=1}^{k-1}\sum_{k=1}^{N} \hat{x}_{km} y_{km} \\ \sum_{m=1}^{k-1}\sum_{k=1}^{N} \hat{x}_{km} \end{pmatrix} \quad (30)$$

$$\begin{pmatrix} a_{21} \\ a_{22} \\ y_0 \end{pmatrix} = M^{-1} \begin{pmatrix} \sum_{m=1}^{k-1}\sum_{k=1}^{N} \hat{y}_{km} x_{km} \\ \sum_{m=1}^{k-1}\sum_{k=1}^{N} \hat{y}_{km} y_{km} \\ \sum_{m=1}^{k-1}\sum_{k=1}^{N} \hat{y}_{km} \end{pmatrix} \quad (31)$$

The minimum error energy E may be calculated using Equation (21), and may be compared with an allowable limit. If the error energy E is greater than the allowable limit, then it is assumed that an affine match has not been found. It is also possible to calculate maximum point deviations by comparing intersection points $(x_{km}, y_{km})$ and $(\tilde{x}_{km}, \tilde{y}_{km})$, which is useful for establishing a reliability measure of the estimated distortion. Another useful parameter, especially with regard to reliability estimation, is the normalized energy; namely the error energy E divided by the centred mean square point distribution G, defined as follows for any set of points n=1→M:

$$\frac{E}{G} = \frac{\sum_{n=1}^{M} (\hat{x}_n - \tilde{x}_n)^2 + (\hat{y}_n - \tilde{y}_n)^2}{\sum_{n=1}^{M} (\hat{x}_n - \bar{\hat{x}}_n)^2 + (\hat{y}_n - \bar{\hat{y}}_n)^2} \quad (32)$$

where the centroid of the measured point distribution is defined as $(\bar{x}_n, \bar{y}_n)$.

Figure 3:
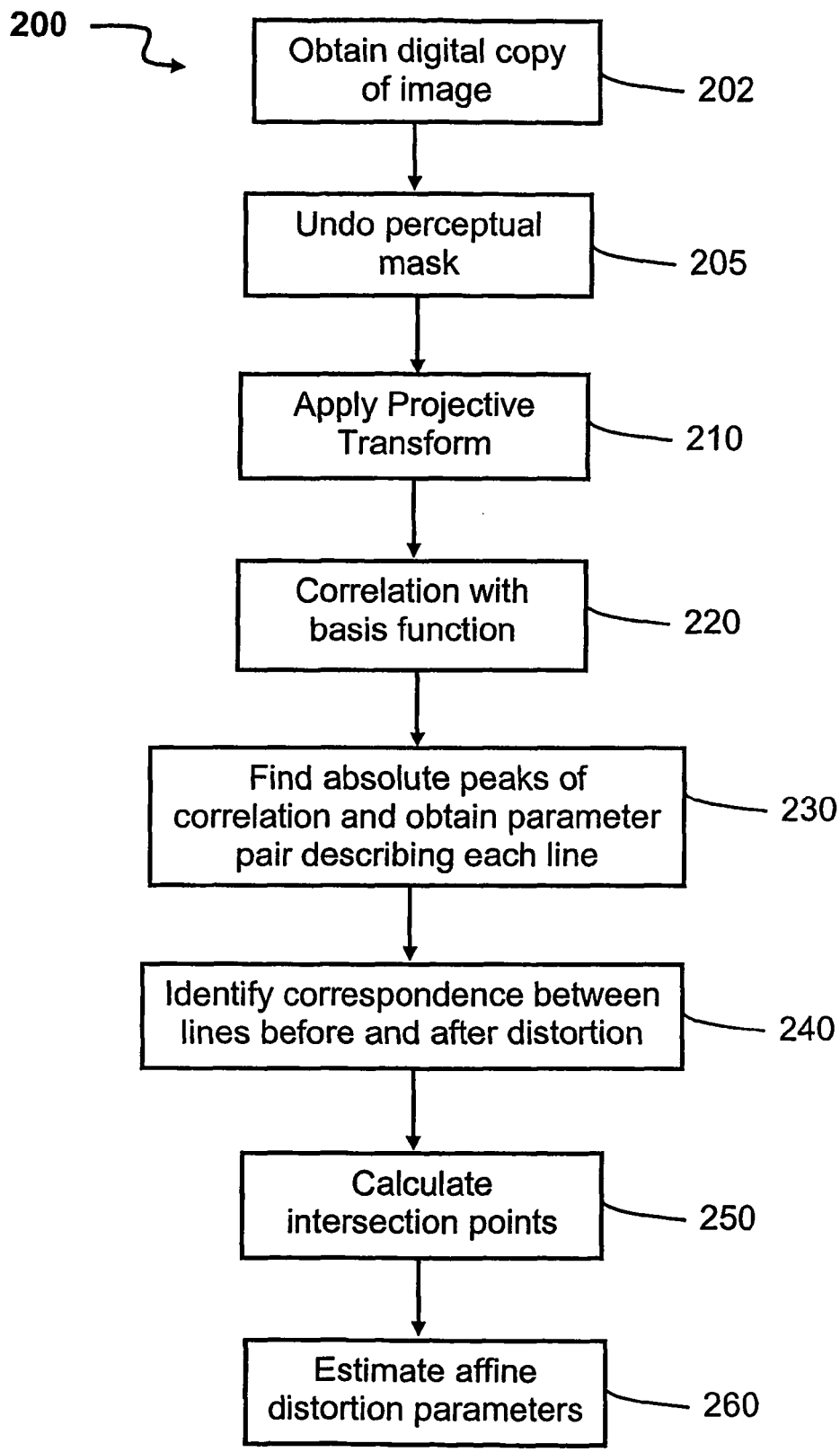
FIG. 3 shows a schematic flow diagram of a method of detecting parameters of an affine distortion from an image.
Figure 4:
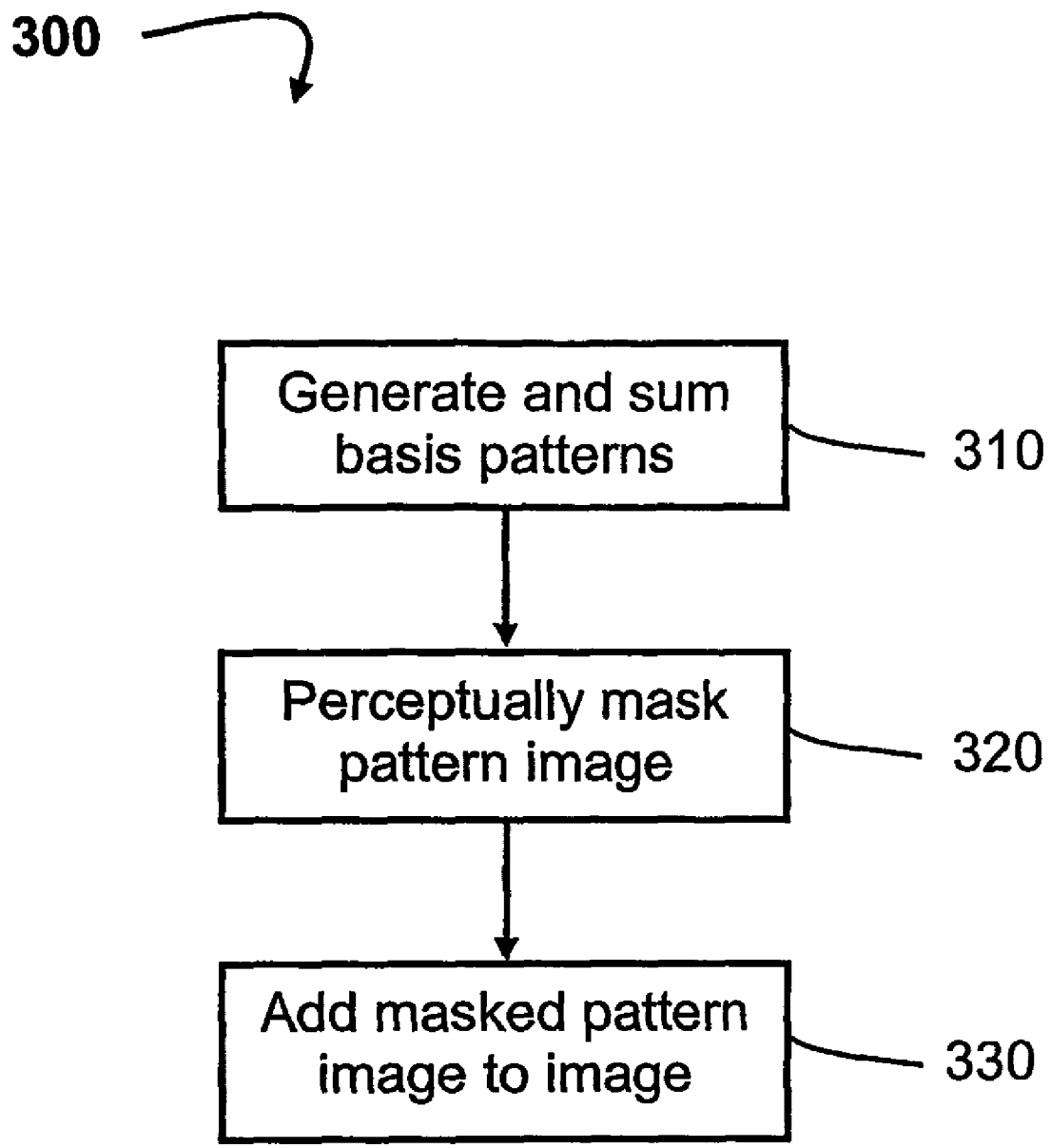
FIG. 4 shows a schematic flow diagram of a method of embedding the straight-lines using watermarks.

Accordingly, FIG. 3 shows a schematic flow diagram of a method 200 of detecting parameters of an affine distortion from an image having at least 4 non-parallel straight-lines therein. In one implementation the non-parallel straight-lines are embedded into the image in a manner in which the straight-lines are invisible to the human eye. FIG. 4 shows a schematic flow diagram of a method 300 of embedding the straight-lines using watermarks.

Figure 5:
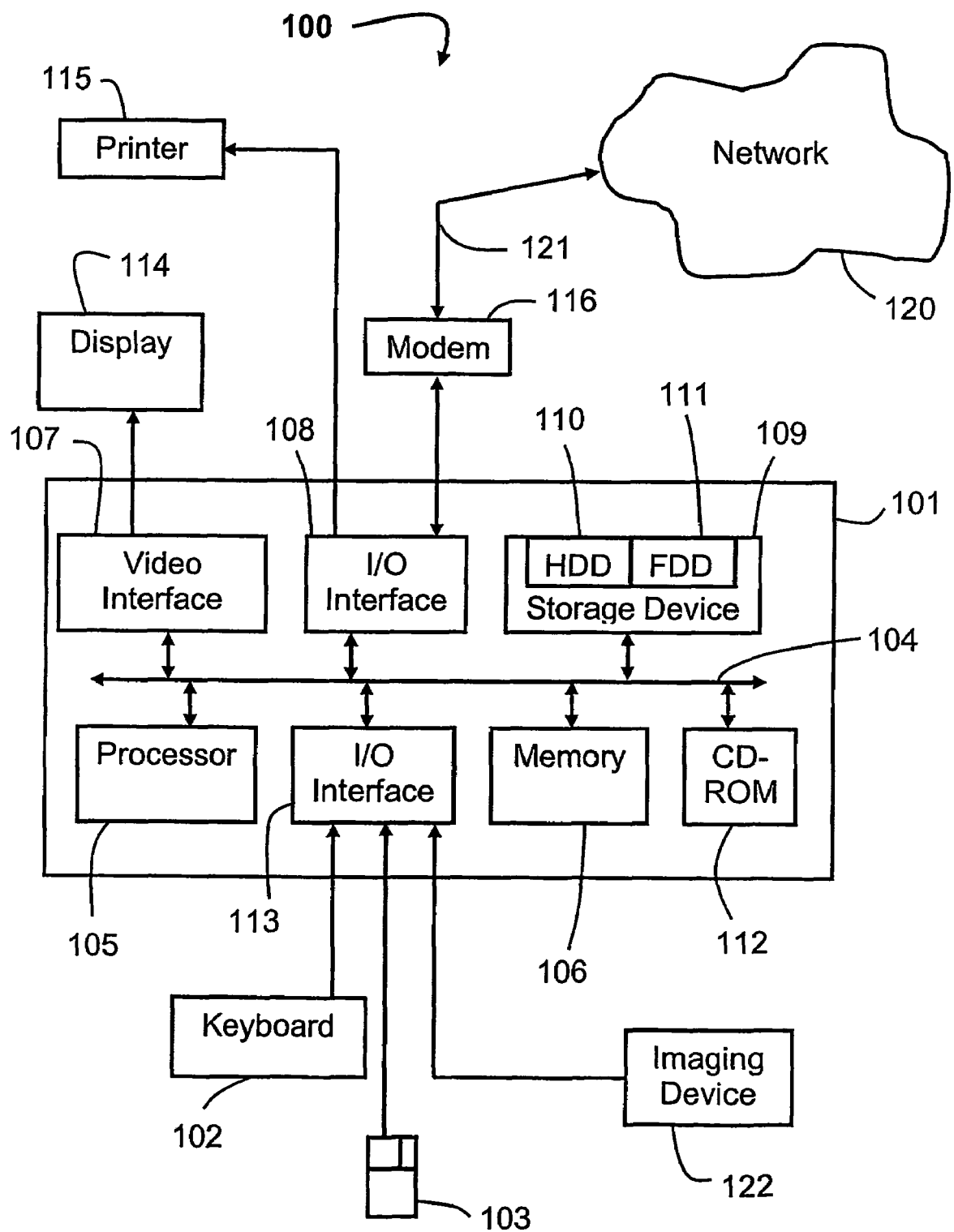
FIG. 5 is a schematic block diagram of a general purpose computer upon which arrangements described can be practiced.

The methods 200 and 300 are preferably practiced using a general-purpose computer system 100, such as that shown in FIG. 5 wherein the steps of the methods 200 and 300 are implemented as software executing within the computer system 100. In particular, the steps of the method 200 and 300 are effected by instructions in the software that are carried out by the computer system 100. The software may be stored in a computer readable medium, including the storage devices described below, for example. The software is loaded into the computer from the computer readable medium, and then executed by the computer system 100. A computer readable medium having such software or computer program recorded on it is a computer program product.

The computer system 100 is formed by a computer module 101, input devices such as a keyboard 102, mouse 103 and an imaging device 122, output devices including a printer 115 and a display device 114. The imaging device 122 may be a scanner or digital camera used for obtaining a digital image. A Modulator-Demodulator (Modem) transceiver device 116 is used by the computer module 101 for communicating to and from a communications network 120, for example connectable via a telephone line 121 or other functional medium.

The computer module 101 typically includes at least one processor unit 105, and a memory unit 106, for example formed from semiconductor random access memory (RAM) and read only memory (ROM). The module 101 also includes an number of input/output (I/O) interfaces including a video interface 107 that couples to the video display 114, an I/O interface 113 for the keyboard 102, mouse 103 and imaging device 122, and an interface 108 for the modem 116 and printer 115. A storage device 109 is provided and typically includes a hard disk drive 110 and a floppy disk drive 111. A CD-ROM drive 112 is typically provided as a non-volatile source of data. The components 105 to 113 of the computer module 101, typically communicate via an interconnected bus 104 and in a manner which results in a conventional mode of operation of the computer system 100 known to those in the relevant art.

Typically, the software is resident on the hard disk drive 110 and read and controlled in its execution by the processor 105. In some instances, the software may be supplied to the user encoded on a CD-ROM or floppy disk and read via the corresponding drive 112 or 111, or alternatively may be read by the user from the network 120 via the modem device 116. Still further, the software can also be loaded into the computer system 100 from other computer readable media.

The method of 200 of detecting parameters of an affine distortion from an image comprising at least 4 non-parallel straight-lines therein and the 300 of embedding the straight-lines using watermarks may alternatively be implemented in dedicated hardware such as one or more integrated circuits performing the functions or sub functions of thereof Such dedicated hardware may include graphic processors, digital signal processors, or one or more microprocessors and associated memories.

Referring first to FIG. 4, the method 300 of embedding the straight-lines, each straight-line n being defined by the parameter pair $\{r_n, \beta_n\}$, using watermarks starts in step 310 where a pattern associated with each straight-line n is generated.

Figure 6:
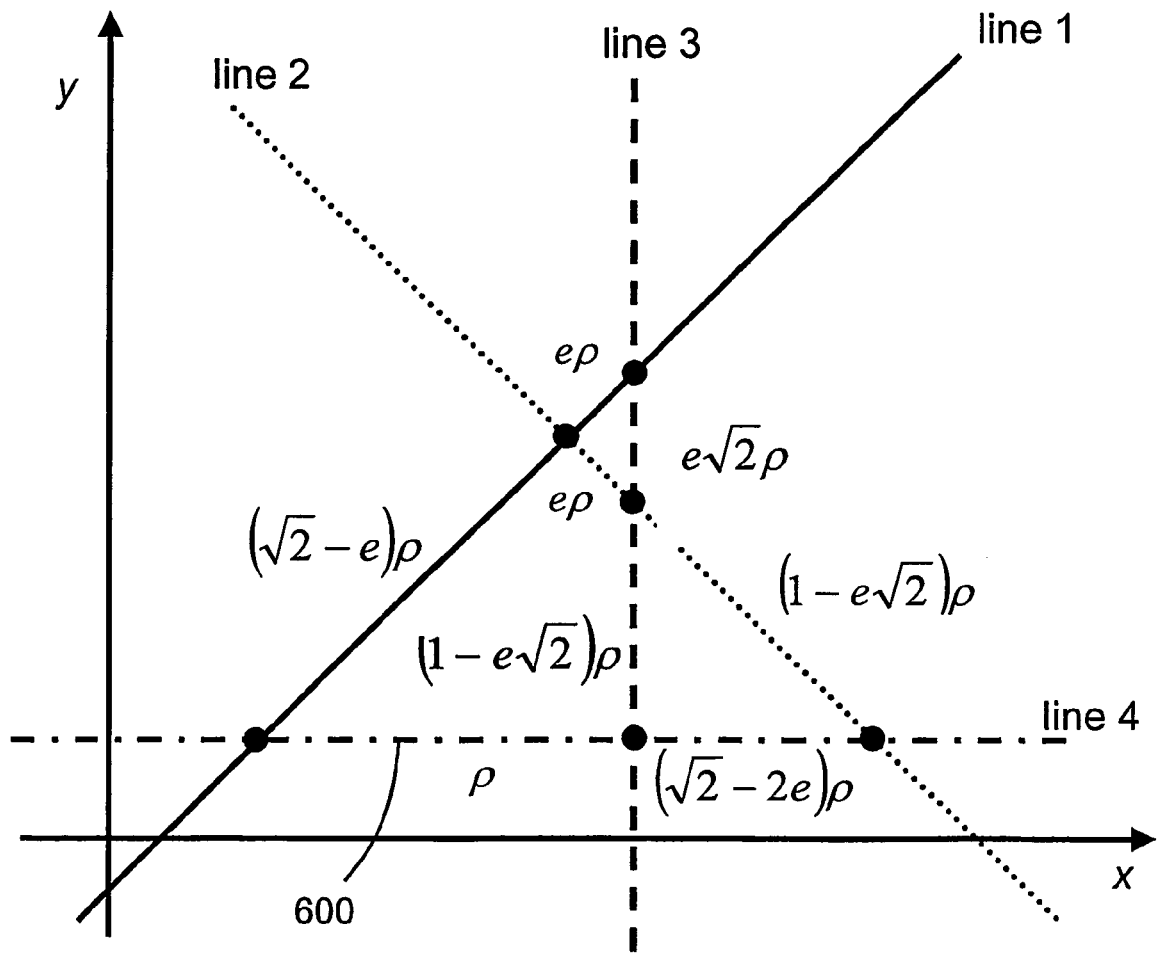
FIG. 6 shows 4 lines arranged such that the orientation angles $\beta_n$ of the lines are uniformly distributed over the fall angular range.

When choosing the parameter pair $\{r_{nl}, \beta_n\}$ of the lines to be embedded, one option is to choose 4 lines having angles $\beta_n$ that are uniformly distributed over the full angular range, i.e. at 0°, 45°, 90°, 135°. FIG. 6 shows the 4 lines arranged in such a fashion.

A number of arrangements of the four straight-lines give highly symmetric results. The arrangement shown is less symmetric. It contains six intersection points $(x_{km}, y_{km})$ that can be distinguished from a reflected and distorted version of itself. Fewer intersections are possible in degenerate arrangements where more than two lines meet at a point, but are not considered here.

Also shown on FIG. 6 are the lengths $\xi_{n1}$ and $\xi_{n2}$ of line segments for n=1 to 4, defined with reference to the length p of segment 600, in terms of a further parameter e. The length ratios $R_n$, defined in Equation (15), of line segments as a function of the parameter e are calculated as shown in Table 1, together with the line length $l_n$ defined in Equation (18):

TABLE 1

| Line n | Length Ratio $R_n$ | Total Length $L_n$ |
|---|---|---|
| 1 | $\dfrac{e}{\sqrt{2}-e}$ | $\sqrt{2}\,\rho$ |
| 2 | $\dfrac{e}{\sqrt{2}-2e}$ | $(\sqrt{2}-e)\rho$ |
| 3 | $\dfrac{e\sqrt{2}}{1-e\sqrt{2}}$ | $\rho$ |
| 4 | $1-e\sqrt{2}$ | $(2-e\sqrt{2})\rho$ |

Figure 7:
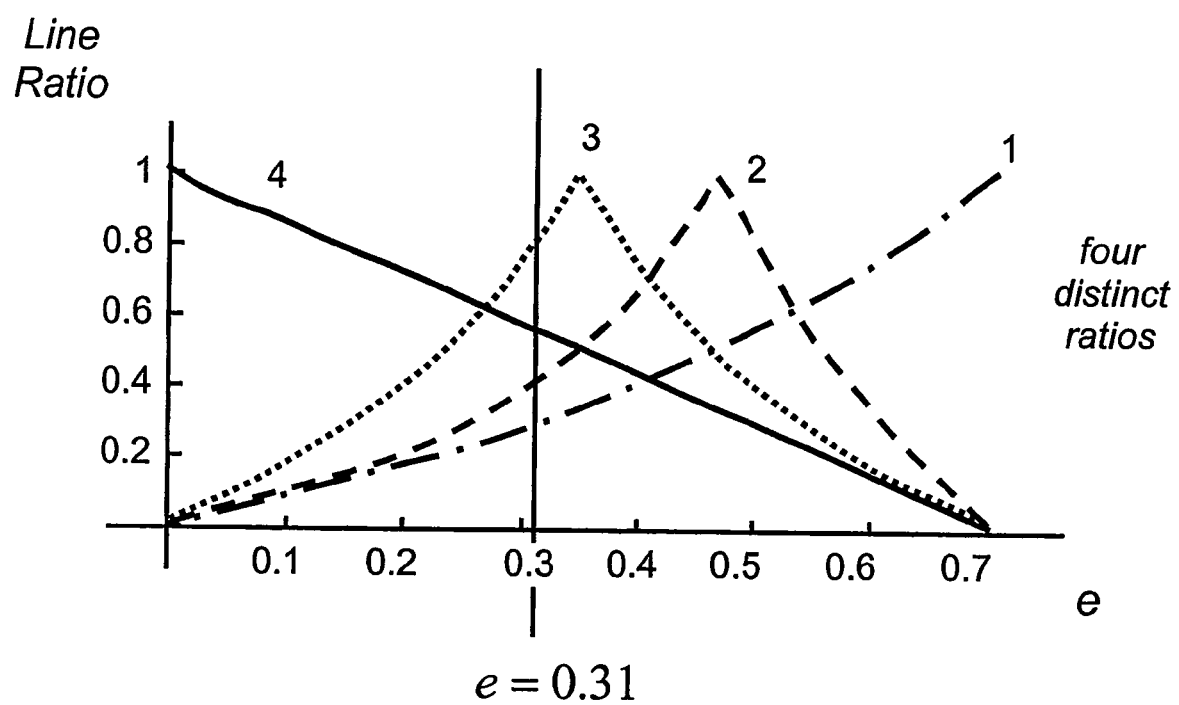
FIG. 7 shows the length ratios of line segments as a function of the parameter e.

FIG. 7 shows the length ratios $R_n$ of line segments as a function of the parameter e. It can be seen from FIG. 7 that the particular value e≅0.31 gives 4 quite different and distinct length ratios $R_n$. Another interesting and useful set of length ratios $R_n$ occurs for e=0.5. In this case all four straight-lines are equidistant from a central fiducial point; essentially allowing a seventh point to be defined, although it is a point that does not remain truly invariant to shear or anamorphic scaling because the equi-distances are potentially unequally transformed by affine distortions.

In the preferred implementation (e=0.31) 4 straight-lines are embedded having parameters as follows:

$$\begin{cases} \beta_1 = -67.5°, r_1 = -p/(2+\sqrt{2}) \\ \beta_2 = +22.5°, r_2 = p(1-e)/\sqrt{2} \\ \beta_3 = -22.5°, r_3 = p/(2+\sqrt{2}) \\ \beta_4 = +67.5°, r_4 = -p/(2+\sqrt{2}) \end{cases} \quad (33)$$

where p is set to the image width. Note that the negative values of $r_n$ are equivalent to their positive counterparts, provided the corresponding angle $\beta_n$ is rotated by 180°.

The preferred choice of orientation angles $\beta_n$ avoids any coincidence between any one straight-line n and image boundaries by the largest amount.

When the straight-lines are embedded as watermarks, each watermark has to have the property that it can be detected even after the image into which it is embedded has been affine distorted. According to the preferred implementation each pattern has variation in one direction only, that direction being perpendicular to the straight-line n. The pattern also has an axis, which may be an axis of (odd or even) symmetry or a nominated axis, which coincides with the line. The patterns are typically generated from a one-dimensional basis function applied at the direction of variation and repeated parallel to the axis.

In a preferred implementation, the basis function is a complex homogeneous function of the form:

$$g(v)=|v|^{p+i\alpha}=|v|^p\exp(i\alpha\log[|v|]) \quad (34)$$

where v is a one-dimensional coordinate, which is not necessarily positive, while α and p are constants. The basis function g(v) is preferably attenuated in areas where the basis function has a frequency above the Nyquist frequency of the pattern image. Equation (34) may be considered as an amplitude function, amplitude modulating a phase function, with the phase function having a logarithmic phase. When such a complex homogeneous function g(v) is scaled, say by a factor α, the scaling only introduces a complex constant factor as follows:

$$g(\alpha v)=\alpha^{p+i\alpha}g(v) \quad (35)$$

The advantage of the complex homogeneous function is that the auto-correlation of the complex homogeneous function is directly proportional to the cross-correlation of the complex homogeneous function with a scaled version of the complex homogeneous function. This 'scale-invariant' property allows a watermark to be detected in an image even after a scale transformation by correlating the image with the basis function.

Figure 8:
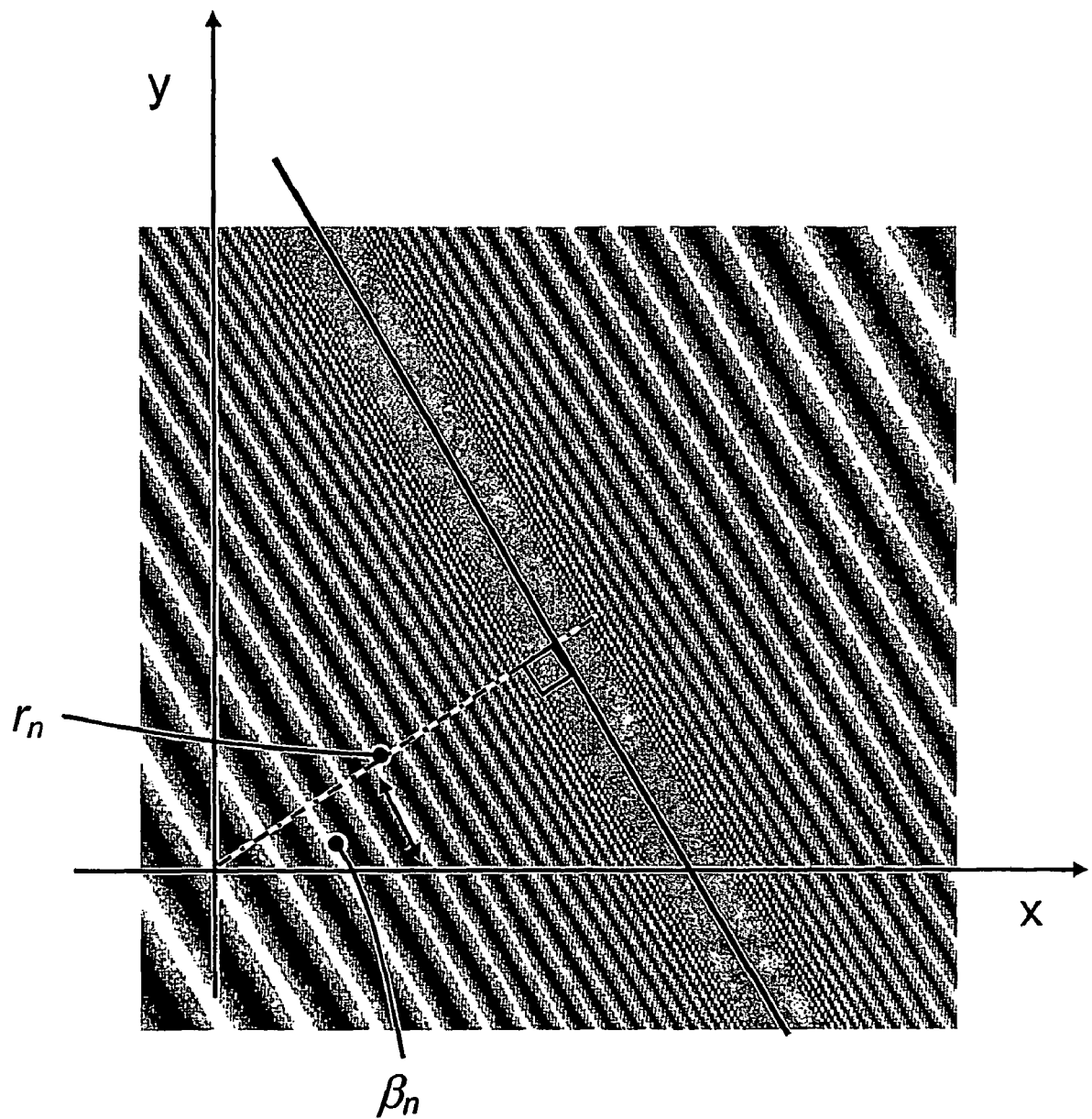
FIG. 8 illustrates an example pattern that may be used as a watermark.

FIG. 8 illustrates an example pattern generated using a real part of the basis function of Equation (34) as follows:

$$g(x,y)=Re\{g(x\cos\beta_n+y\sin\beta_n-r_n)\} \quad (36)$$

Note that masking has been applied at the area adjoining the axis of symmetry to remove values with a frequency above the Nyquist frequency of the pattern image. Also illustrated is the relationship of the pattern with the straight-line it embeds. It would be understood that the straight-line itself does not form part of the pattern, and would not be added to the image in the steps that follows. In illustrating the example pattern, pattern values have been mapped to values in the range of [0, 255], with a value of 0 being represented as the colour black and a value of 255 being represented as the colour white.

Referring again to FIG. 4, also in step 310 the separate patterns are summed together to form a pattern image. The pattern image may be stored after generation in the memory 106 or HDD 110.

In order to embed patterns that are imperceptible to a human observer, the pattern image is retrieved from the memory 106 and is perceptually masked in step 320 by the processor 105 in order to greatly reduce the levels of the patterns corresponding to regions of the image having low intensity variation, and reduce by a lesser amount the levels of the patterns corresponding to regions of the image having high intensity variation. An example measure of intensity variation is the local gradient magnitude of the luminance in the image. Other measures include second partial derivatives of the luminance; local estimates of the "energy" or frequency content, local variance, and more sophisticated estimates of human visual system masking.

The perceptually masked pattern image, which may be called a watermark, is added to the image, in step 330. If the image is a colour image, then the watermark is preferably added to the luminance part of a colour image. This allows the watermark to survive when the watermarked image is converted from colour to a greyscale representation. Alternatively, the watermark may be added to one or more of the R, G, B, H, V, S, u, v etc channels of the colour image, or any combination thereof. Apart from simple algebraic addition, addition of the watermark to the image also includes dithering and half-toning. The real and imaginary parts of a complex basis function may be added independently to two or more channels of the colour image.

The image with the embedded watermark may be stored on storage device 109 (FIG. 5) in a digital image format, such as tiff, gif, jpeg, mpeg etc. The watermarked image may also be printed on printer 115 (FIG. 5) to create a hardcopy of the watermarked image, or may be communicated to another computer module 101 using the network 120.

With the straight-lines embedded into the image, and the image having been affine distorted, the straight-lines and their parameter pair $\{\tilde{r}_n,\tilde{\beta}_n\}$ have to be detected. With the straight-lines embedded using watermarks in the manner described with reference to FIG. 4, method 200 of detecting the parameters of the affine distortion from the image is now described with reference to FIG. 3. Method 200 starts in step 202 where a digital copy of the distorted image is obtained. Typically the image may already be in a digital image format and stored on storage device 109 (FIG. 5). In such cases the image is converted to an array of pixel values. If the image is still in a hardcopy format, such as a photograph, then the hardcopy image is first converted into a digital format by scanning the hardcopy using the imaging device 122 (FIG. 5).

Step 205 follows where the processor 105 undoes the perceptual masking by first forming a perceptual mask from the image, and then emphasising the image with the perceptual mask by dividing the values of the image by the corresponding values of the perceptual mask. It is noted that an approximate perceptual mask is adequate.

A projective transform is then applied to the resulting image in step 210. The projective transform accumulates energy by summing values along straight lines in the image. The Radon (or equivalently Hough) transform is one such projective transform that may be used in step 210 and is defined as:

$$R_\theta\{h(x, y)\} = \int_{-\infty}^{+\infty} \int_{-\infty}^{+\infty} h(x, y)\delta(r - x\cos\theta - y\sin\theta) dx\, dy \quad (37)$$

In order to derive a convenient implementation of the Radon transform for a discrete dataset, a useful correspondence between the projection of the image function h(x,y) and the slices of the function's Fourier transform is used, that correspondence being known as the "projection-slice theorem".

The projection-slice theorem states that the one-dimensional Fourier transform of a projection of a two dimensional function is equal to a radial slice of the two-dimensional Fourier transform of that function. Note that $$H(u, v) = \int_{-\infty}^{+\infty} \int_{-\infty}^{+\infty} h(x, y)\exp[-2\pi i(ux + vy)] dx\, dy \quad (38)$$

wherein H(u,v) is the 2-D Fourier transform of image h(x, y). In the quasi polar space the angles are in the range (−π/2, π/2], while distance is in the range (−∞,∞). By defining quasi-polar coordinates (q,φ) in the Fourier domain, the lo coordinate transform is u=q cos φ, v=q sin φ, and one form of the projection-slice theorem is obtained for the Fourier polar angle corresponding to the Radon projection angle φ=θ as follows:

$$\int_{-\infty}^{+\infty} R_\theta(r)\exp[-2\pi i(rq)] dr = H(q\cos\theta, q\sin\theta) \quad (39)$$

Equation (39) is useful because it allows estimation of (the Fourier transform of) a Radon projection as a radial slice of the 2-D-FFT of a discrete image. This suggests that a discrete Radon transform may be evaluated by first performing a 2-D FFT followed by a Cartesian to polar remapping, using a suitable interpolation—such as bicubic, or chirp-z—to perform the resampling.

The image h(x,y) having embedded therein N patterns based on one-dimensional basis function g(v) having an orientation angle $\tilde{\beta}_n$ and perpendicular displacement $\tilde{r}_n$, and ignoring the pixel values of the image itself, may be written as:

$$h(x, y) = \sum_{n=1}^{N} g(x\cos\tilde{\beta}_n + y\sin\tilde{\beta}_n - \tilde{r}_n) \quad (40)$$

Figure 9:
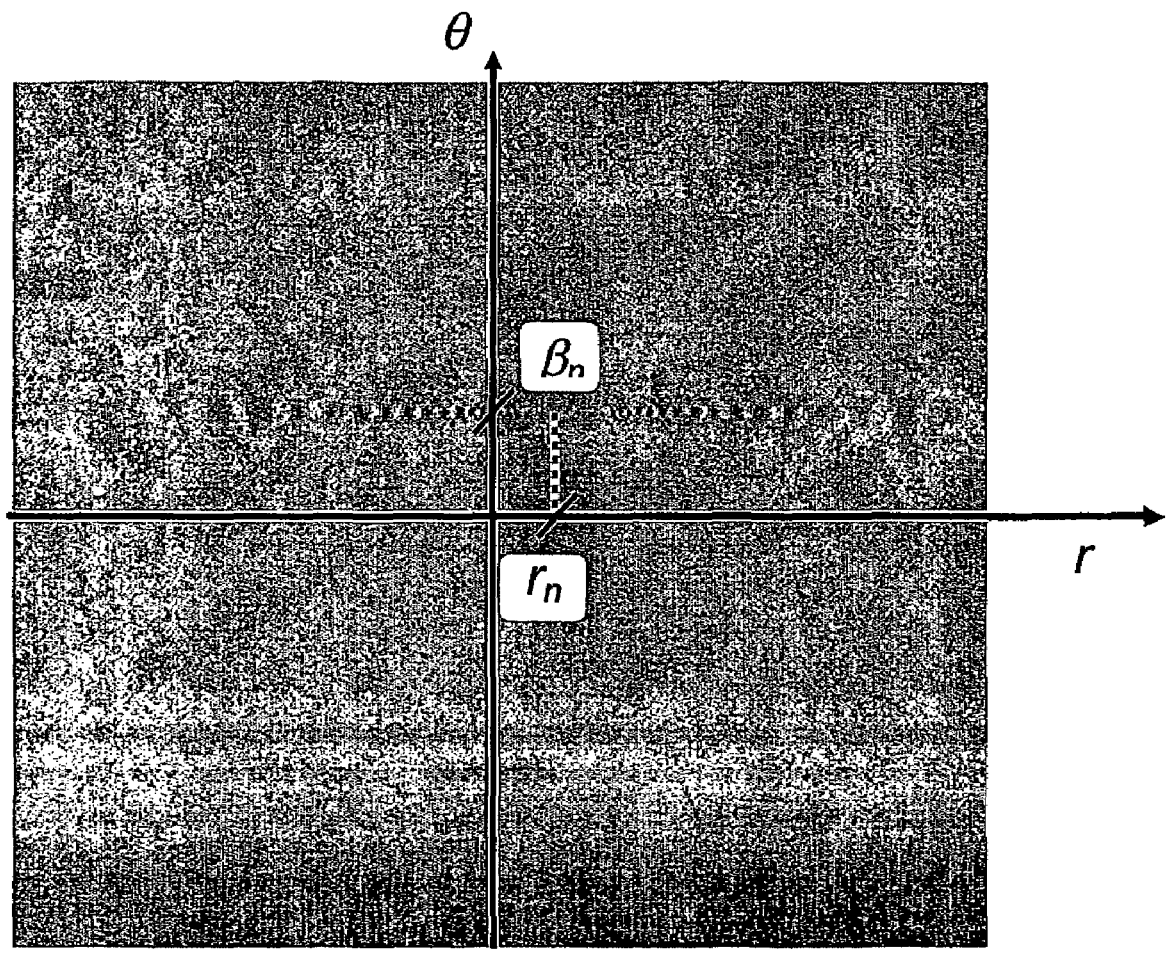
FIG. 9 illustrates the projection of the undistorted example pattern illustrated in FIG. 8, plotted in the quasi-polar space.

When the projection transform is applied to a pattern having a variation in only one direction with that direction being at an orientation angle $\tilde{\beta}_n$, then the values of the projection are significantly higher when the angle θ is equal to the orientation angle $\tilde{\beta}_n$ compared to all other values of angle θ. FIG. 9 illustrates the projection of the undistorted example pattern illustrated in FIG. 8, plotted in the quasi-polar space. It can be seen that the values of the projection are significantly higher when the angle θ is equal to the angle $\beta_n$. The projection also has symmetry about the offset distance $r_n$.

Hence, by applying the Radon transforms on the functions in Equation (40), it can be shown that the Radon transform of such a function is constrained to a line where $\theta = \tilde{\beta}_n$ as shown in the following:

$$R_\theta\{h(x, y)\} = \sum_{n=1}^{N} g(r - \tilde{r}_n)\delta(\theta - \tilde{\beta}_n) \quad (41)$$

Having concentrated the image function h(x,y) having the embedded patterns g(v) onto N single lines in quasi-polar space by the use of Radon transform, it is further possible to concentrate the energy contained in each of the lines into a single point (or into a small region near a point) by using 1-D quasi-radial correlations (in coordinate r) detection for all values of the polar angle θ.

Accordingly, step 220 follows where the processor 105 performs 1-D correlations between the projection and the basis function g(v) in the quasi-radial coordinate r for all possible values of the polar angle θ. The term "correlation" also includes phase correlation and phase correlation scaled by energy. The resulting correlations have peaks at quasi-polar coordinates $(\hat{r}_n, \hat{\beta}_n)$.

In step 230 the processor 105 finds the absolute peaks of the correlation. The orientation angle $\hat{\beta}_n$ and perpendicular displacement $\hat{r}_n$ of each distorted embedded pattern is directly available from the quasi-polar coordinates $(\hat{r}_n, \hat{\beta}_n)$ of the peaks. Also, the parameters pair $\{r_n, \beta_n\}$ of the embedded straight-lines are available.

The pre-processing stage of the detector finds a number of candidate lines, typically about 64, based on the highest correlation magnitude peaks. From this number, all combinations of four lines are scrutinized. The number of possible combinations is 64!/(60!4!)=635376. If the angles of the four lines do not all differ by at least 15°, then that combination is dismissed and does not pass on to the next stage. Assuming a combination of lines passes this stage, then the six intersection points are calculated using Equation (19) and the four sets of line segment ratios $\hat{R}_n$, evaluated. The ratios $\hat{R}_n$ are then placed in order of increasing size. A merit function for the closeness of fit to the expected line ratios (also placed in order of increasing size) is then evaluated as:

$$\sum_{n=1}^{4} \left(\frac{\hat{R}_n}{R_n} - 1\right)^2 \quad (42)$$

All combinations with a merit function below a certain threshold (preferably 0.1) are labelled as "candidate combinations" for further processing.

Note that other merit functions could be used, for example the above merit function could be weighted to reflect the line strength (in terms of the line correlation magnitude) and thus reduce contributions from weakly detected lines.

The following processing is then carried out fro each candidate combination.

In step 240 the processor uniquely identifies the correspondence between each straight-line n before and after affine distortion. In the preferred implementation the length ratios $\hat{R}_n$ of the lines after distortion are matched with the length ratios $R_n$ before distortion and in a manner described with reference to Equation (15) are used to uniquely identify the correspondence between each straight-line before and after affine distortion.

Another technique that may be used to uniquely identify the correspondence between each straight-line before and after affine distortion is to use basis functions having different parameters to embed each line. In such an implementation steps 220 and 230 are repeated with each basis function.

Using Equation (20) and in step 250 the processor 105 next calculates the intersection points $(\hat{x}_{km}, \hat{y}_{km})$. Finally, in step 260, the affine distortion parameters $\{\alpha_{11}, \alpha_{12}, \alpha_{21}, \alpha_{22}, x_0, y_0\}$ are estimated using LSF described above with reference to Equations (21) to (32).

The final affine distortion parameters are chosen to be those producing the lowest minimum error energy E (Equation (21)) over all candidate combinations.

Once the affine distortion parameters $\{\alpha_{11}, \alpha_{12}, \alpha_{21}, \alpha_{22}, x_0, y_0\}$ are estimated, the affine distortions may be inverted, sometimes called rectification or registration.

Once the affine distortions are inverted, additional patterns, named auxiliary patterns, that existed in the image prior to adding the patterns in step 330 (FIG. 4) may be detected using conventional methods, such as the detection of pseudo random noise (PRN) sequences via the process of correlation. Such a process is also known as spread-spectrum watermarking, and is notorious for its extreme sensitivity to geometric distortion. A few percent change in scale is usually enough to virtually destroy the correlation, and makes it impossible to detect PRN in slightly distorted images.

However, the process of un-distorting and aligning the image involves interpolation and resampling, which are typically computationally expensive. Therefore, it is proposed to avoid rectifying the image by using a complementarily distorted detection template when detecting the auxiliary patterns.

The major advantage of this approach is that the template may be defined in the Fourier domain. Affine distortions in the spatial domain lead to corresponding affine distortions in the Fourier domain, along with linear phase factors related to the translation distortion. The Fourier affine correspondence is well documented in the literature. Essentially the template has the Fourier version of Equation (2) applied. Defining the continuous Fourier transformation as follows, and noting that exactly corresponding relations apply for discretely sampled images and the discrete Fourier transform (DFT) and its more efficient implementation, the fast Fourier transform (FFT):

$$J(u,v) = \int \int j(x,y) \exp(-2\pi i[ux+vy]) dx dy \quad (43)$$

The Fourier transform of a distorted template function is $$\kappa J(\tilde{u},\tilde{v}) = \int \int j(\tilde{x},\tilde{y}) \exp(-2\pi i[ux+vy]) dx dy \quad (44)$$

The affine distortion of Equation (2) in the Fourier domain is given by $$\begin{pmatrix} \tilde{u} \\ \tilde{v} \end{pmatrix} = \frac{1}{a_{11}a_{22} - a_{21}a_{12}} \begin{pmatrix} a_{22} & -a_{12} \\ -a_{21} & a_{11} \end{pmatrix} \begin{pmatrix} u \\ v \end{pmatrix} \quad (45)$$

wherein the factor κ contains a real normalization constant and a linear phase factor, but otherwise does not affect the distorted Fourier template $J(\tilde{u},\tilde{v})$, so that the distorted Fourier template $J(\tilde{u},\tilde{v})$ is used directly in the Fourier domain implementation of correlation detection. Hence, certain templates $j(x,y)$ may be distorted using Equation (45) without the need for interpolation or resampling, if the Fourier template $J(\tilde{u},\tilde{v})$ is defined by a deterministic, analytic functional descriptor. Only the Fourier coordinates u and v need to be distorted prior to the template matching.

The auxiliary patterns may be used to encode some data or a pointer to that data, for example using a URL or pointer to that URL. Also, using the method 200 of detecting the parameters of the affine distortion from the image, the so-called image metadata, which is data about, or referring to some property of that image, is thus bound to the image in that the metadata can be retrieved from the image even if the image is distorted. The distortions that the metadata can resist include the projective transforms above, but also include: Printing, Photocopying/copying, Scanning, Colour removal, gamma correction, gamma change, JPEG compression/general compression, format conversion (ie BMP to GIF), noise addition and removal, filtering, such as low-pass filtering, cropping, and almost any editing operations which maintain the basic recognizability of the image.

Certain applications do not require for the straight-lines to be embedded imperceptibly. Also, the straight-lines may be embedded onto any planar surface by engraving or etching. Such planar surfaces include silicon wafers. The distorted straight-lines may then be detected by some system which may be optical (such as a camera), electromagnetic, or proximity based. The detected straight-lines may be then utilized to determine the surface's position and orientation.

The foregoing describes embodiments based upon the embedding of N straight lines. A revised version of the method 200 may also be applied to images having straight lines therein associated with features in the image. For such inherent lines, it is not possible to constrain, a priori, the four intersection ratios of each possible quartet of lines. It is however possible to compare the extant line ratios in a first image with those in a second image. For each quartet of matching ratios (within some predefined tolerance range) the corresponding affine transform is calculated using steps 240 to 260 of the method 200. Steps 240 to 260 are then repeated for matching ratio quartets. If the corresponding affine transforms are consistent (i.e. the affine parameters show clustering), then it is probable that the two images are related to each other via an affine transformation. Hence it is possible to compare two images and estimate whether the second image is related to the first image via an affine transformation.

Let a first image $I_1(x,y)$ be related to a second image $I_2(x,y)$ by an affine transformation or spatial distortion $(x,y) \rightarrow (\tilde{x},\tilde{y})$, with the affine transformation being that defined in Equation (2). The relation between the first image $I_1(x,y)$ and the second image $I_2(x,y)$ may be written as follows:

$$I_2(x,y) = \mu I_1(\tilde{x},\tilde{y}) + n(x,y) \quad (46)$$

wherein μ is an image intensity multiplying factor (or gain) and n(x,y) is function which takes account of the difference between the first and second images.

It is known that conventional methods of image matching (using correlation for example) are not easy to implement for more general affine distortions, because a search over a 6 dimensional space (of the 6 affine parameters) is required in general. Therefore, and in accordance with the teachings herein, a more effective way to compare the first image $I_1(x,y)$ and the second image $I_2(x,y)$ is by comparing the intersection ratios of naturally occurring line structures within the images themselves. Many images contain some line structures or partial line structures, such as straight edges. Preferably such line structures are enhanced, for example by using the modulus of the gradient of pixel intensities. Other operators, such as the Laplacian, may also be used.

Figure 10:
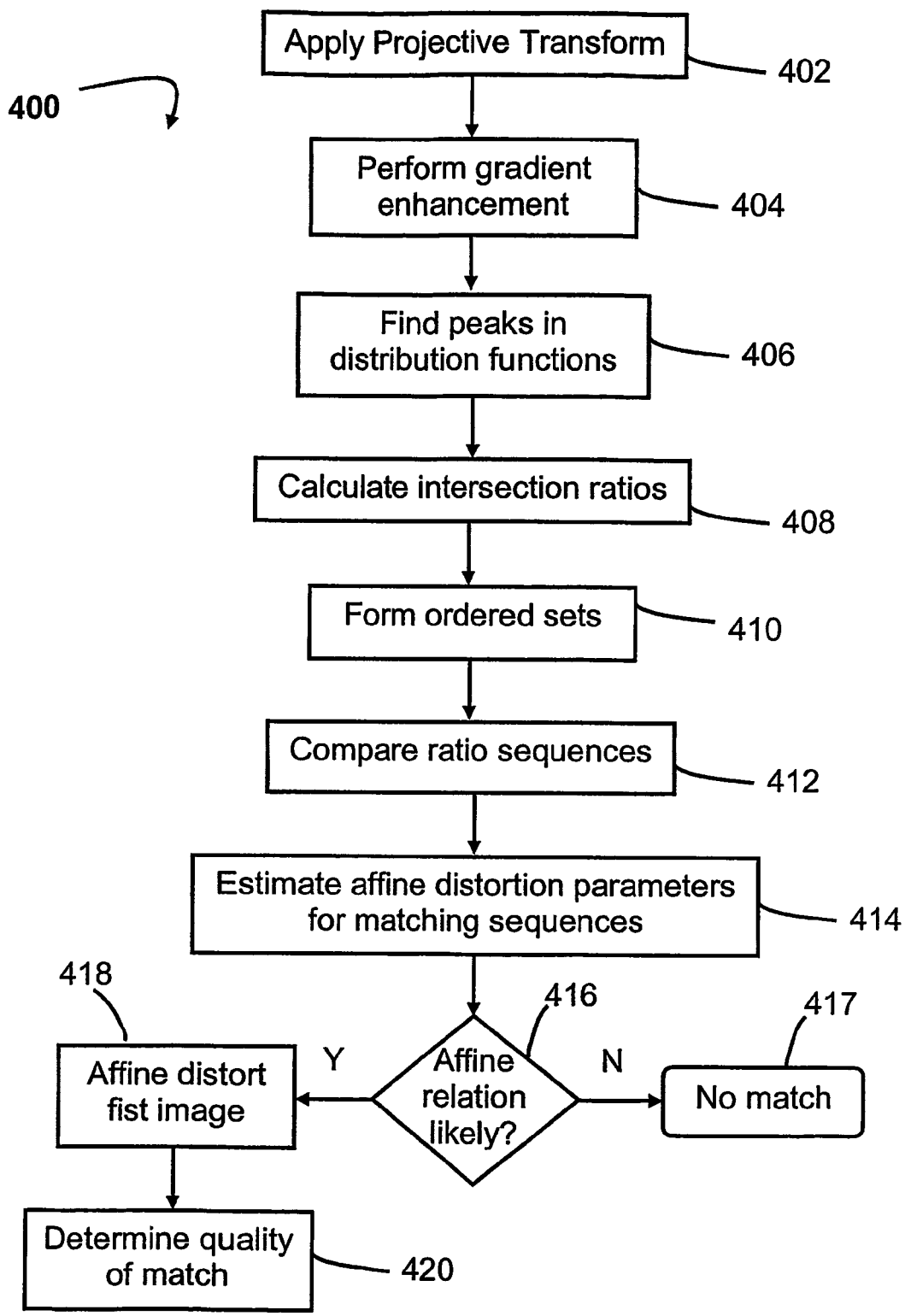
FIG. 10 shows a schematic flow diagram of a method of estimating whether a second image is an affine distorted version of a first image.

FIG. 10 shows a schematic flow diagram of a method 400 of estimating whether the second image $I_2(x,y)$ is an affine distorted version of the first image $I_1(x,y)$. The method 400 is also preferably practiced using the general-purpose computer system 100 shown in FIG. 5, wherein the steps of the method 400 are implemented as software executing within the computer system 100.

The method 400 starts in step 402 where a projective transform, such as the Radon transform, is applied to each of the images $I_1(x,y)$ and $I_2(x,y)$, and in the manner described in relation to step 210 of the method 200.

In practice it is found that enhancement after the Radon transformation is preferable. Accordingly, step 404 follows where gradient enhancement is performed giving the 2-D distribution function $\Omega_j(r,\theta)$ for each image:

$$\Omega_j(r,\theta)=|grad[R_\theta\{I_j(x,y)\}]| \quad (47)$$

In step 406 peaks are detected in each of the distribution functions $\Omega_j(r,\theta)$. The objective is to find corresponding quartets of line structures. So by finding the 32 highest peaks within each of the distribution functions $\Omega_j(r,\theta)$, representing the 32 most significant line structures within each of the images $I_1(x,y)$ and $I_2(x,y)$, the number of possible combinations of 4 lines is 35960.

Step 408 then follows where the processor 105 calculates for each combination of 4 lines the intersection ratios, as is described in detail with reference to the method 200, from the $(r,\theta)$ values of the 4 peaks. The 35960 combinations of ratio quartets are placed in ordered sequences in step 410. As before, if any ratio is greater than 1 it is inverted. The sequence is ordered in terms of increasing value. In particular, all combinations of ratio quartets are placed in a four dimensional table for the first image $I_1(x,y)$ and a separate table for the second image $I_2(x,y)$.

The ratio sequences for the first image $I_1(x,y)$ and the second image $I_2(x,y)$ are next compared in step 412. In particular, the correspondence of each ordered sequence in the first image $I_1(x,y)$ table with those in the second image $I_2(x,y)$ table 2 is evaluated, based on Euclidean distance or the merit function shown in Equation (42). Only correspondence within a predefined distance is allowed. The calculation of merit function is rather computationally intensive and is also related to the square of the number of points (sequences) tested. A more efficient approach is to have a coarse binning of the 4-D ratio table (for example bin widths of 0.2 will give $5^4=625$ bins) and just to evaluate merit function of sequences in corresponding or adjacent bins.

If the merit function is less than the predefined amount, then the line quartet is assumed to match and the consequent affine transformation parameters are computed in step 414 from the intersection points using Equations (21) to (32). Step 414 is repeated for all matched sequences satisfying the merit conditions and the 6 affine parameters are tabulated.

Step 416 follows where the likelihood of an affine relation between the first image $I_1(x,y)$ and the second image $I_2(x,y)$ is estimated. For example, if there is a significant clustering of affine parameter entries in the table, then an affine relation or match between the first image $I_1(x,y)$ and the second image $I_2(x,y)$ is likely. A more quantitative estimate of the likelihood of affine matching can be derived from the clustering statistics.

If the match between the first image $I_1(x,y)$ and the second image $I_2(x,y)$ is considered not likely in step 416, then the method 400 ends in step 417 for example by indicating on a user interface that no match between the images $I_1(x,y)$ and image $I_2(x,y)$ exists. However, if the match between the first image $I_1(x,y)$ and the second image $I_2(x,y)$ is considered likely, then the first image $I_1(x,y)$ is inverse affine distorted in step 418 so that it matches the second image $I_2(x,y)$.

Finally, in step 420, the quality of the match is determined by normalised correlation. A value of 0.9 would indicate a good match. Other measures (e.g. visual) may give a better indication of how well the images match and how well the affine distortion parameters have been estimated.

The foregoing describes only some embodiments of the present invention, and modifications and/or changes can be made thereto without departing from the scope and spirit of the invention, the embodiments being illustrative and not restrictive.

In the context of this specification, the word "comprising" means "including principally but not necessarily solely" or "having" or "including", and not "consisting only of". Variations of the word "comprising", such as "comprise" and "comprises" have correspondingly varied meanings.

The invention claimed is:

1. A method of detecting an affine relation between a first image and a second image, said first and second images each having a line structure with at least four non-parallel straight lines intersecting each other in at least three points on each line, said method comprising the steps of:
    selecting two segments of each line, said segments being defined by the at least three intersection points on the line;
    determining a first set of ratios from the selected segments of each line of the first image;
    determining a second set of ratios from the selected segments of each line of the second image; and
    comparing the first set of ratios to the second set ratios so as to at least determine if an affine relation exists between the line structure of the first image and the line structure of the second image wherein the above steps are performed by a processor.

2. A method as claimed in claim 1 comprising a further step of estimating affine distortion parameters using the intersection points of the straight lines of the first and second images.

3. A method as claimed in claim 2 comprising a further step of inverting affine distortions, said affine distortions being defined by said affine distortion parameters.

4. A method as claimed in claim 3 comprising a further step of determining a measure of said relation by normalized correlation.

5. A method as claimed in claim 1 wherein each of said lines of the first image is embedded in said first image by embedding a pattern in said first image, each pattern having been formed substantially from a one-dimensional basis function, said method further comprising the initial steps of:
    calculating a -projective transform of said second image;
    calculating a 1-D correlation between the projective transform and said basis function for a selection angles; and
    finding peaks of said correlation, wherein the position of each of said peaks provides spatial parameters of one of said embedded patterns.

6. An apparatus for detecting an affine relation between a first image and a second image, said first and second images each having a line structure with at least four non-parallel straight lines intersecting each other in at least three points on each line, said apparatus comprising:

means for selecting two segments of each line, said segments being defined by the at least three intersection points on the line;

means for determining a first set of ratios from the selected segments of each line of the first image; means for determining a second set of ratios from the selected segments of each line of the second image; and means for comparing the first set of ratios to the second set of ratios so as to at least determine if an affine relation exists between the line structure of the first image and the line structure of the second image.

7. An apparatus as claimed in claim 6 further comprising means for estimating affine distortion parameters using the intersection points of the straight lines of the first and second images.

8. An apparatus as claimed in claim 7 further comprising means for inverting affine distortions, said affine distortions being defined by said affine distortion parameters.

9. An apparatus as claimed in claim 8 further comprising means for determining a measure of said relation by normalized correlation.

10. A computer-readable medium having a program stored thereon the program being executable by a computer apparatus to detect affine relation between a first image and a second image, said first and second images each having a line structure with at least four non-parallel straight lines intersecting each other in at least three points on each line, said program comprising:

code for selecting two segments of each line, said segments being defined by the at least three intersection points on the line;

code for determining a first set of ratios from the selected segments of each line of the first image;

code for determining a second set of ratios from the selected segments of each line of the second image; and code for comparing the first set of ratios to the second set of ratios so as to at least determine if an affine relation exists between the line structure of the first image and the line structure of the second image.

11. A program as claimed in claim 10 further comprising code for estimating affine distortion parameters using the intersection points of the straight lines of the first and second images.

12. A program as claimed in claim 11 further comprising code for inverting affine distortions, said affine distortions being defined by said affine distortion parameters.

* * * * *